US008405247B2

(12) United States Patent
Miller et al.

(10) Patent No.: US 8,405,247 B2
(45) Date of Patent: Mar. 26, 2013

(54) METHOD AND APPARATUS FOR CONTROL OF FAULT-INDUCED DELAYED VOLTAGE RECOVERY (FIDVR) WITH PHOTOVOLTAIC AND OTHER INVERTER-BASED DEVICES

(75) Inventors: Nicholas W. Miller, Delmar, NY (US); Robert William Delmerico, Clifton Park, NY (US); Reigh Allen Walling, Clifton Park, NY (US); Einar Vaughn Larsen, Charlton, NY (US)

(73) Assignee: General Electric Company, Schenectady, NY (US)

( * ) Notice: Subject to any disclaimer, the term of this patent is extended or adjusted under 35 U.S.C. 154(b) by 68 days.

(21) Appl. No.: 12/970,350

(22) Filed: Dec. 16, 2010

(65) Prior Publication Data

US 2012/0049629 A1 Mar. 1, 2012

(51) Int. Cl.
*H02J 7/00* (2006.01)
*H02J 9/00* (2006.01)
(52) U.S. Cl. ............................................ 307/64; 307/87
(58) Field of Classification Search .................... 307/64, 307/87; 361/23
See application file for complete search history.

(56) References Cited

U.S. PATENT DOCUMENTS

| | | | |
|---|---|---|---|
| 7,271,571 | B2 | 9/2007 | Ye et al. |
| 7,417,333 | B2 | 8/2008 | Miller et al. |
| 2011/0074215 | A1* | 3/2011 | Vartanian et al. ............... 307/46 |

OTHER PUBLICATIONS

Einar V. Larsen and Nicholas W. Miller, GE Power Systems Engineering Department, GE Industrial & Power Systems, Benefits of GTO-Based Compensation Systems for Electric Utility Applications, EPRI RP2707-1 Topical Report, Jul. 1990, 10 pages, United States.

Einar Larsen, Benefits of GTO-Based Compensation Systems for Utility Applications, GE Power Systems Engineering Department, Nov. 1990, 22 pages, United States.

NERC, A Technical Reference Paper Fault-Induced Delayed Voltage Recovery, Version 1.2, Transmission Issues Subcommittee and System Protection and Control Subcommittee, Jun. 2009, 33 pages, United States.

NERC, Dmitry Kosterev, et al., Delayed Voltage Recovery, A NERC Planning Committee White Paper Developed by the NERC Transmission Issues Subcommittee, Executive Summary, 16 pages, United States, Dec. 3, 2008.

* cited by examiner

*Primary Examiner* — Carlos Amaya
(74) *Attorney, Agent, or Firm* — James McGinnes, Esq.; Armstrong Teasdale LLP

(57) ABSTRACT

A method of assembling a motor stall correction system includes coupling an inverter-based electric power generation device to an electric power inverter assembly. The method also includes coupling the electric power inverter assembly to at least one induction motor. The method further includes operatively coupling at least one controller to the electric power inverter assembly. The controller is programmed to transmit electric current from the inverter-based electric power generation device to the electric power inverter assembly. The controller is also programmed to transmit real current and reactive current from the electric power inverter assembly to the induction motor. The controller is further programmed to modulate the real current and the reactive current as a function of at least one of an electric power grid frequency and an electric power grid voltage.

16 Claims, 4 Drawing Sheets

METHOD AND APPARATUS FOR CONTROL OF FAULT-INDUCED DELAYED VOLTAGE RECOVERY (FIDVR) WITH PHOTOVOLTAIC AND OTHER INVERTER-BASED DEVICES

BACKGROUND OF THE INVENTION

The subject matter described herein relates generally to utility grid support and, more particularly, to methods and apparatus for facilitating control of a fault-induced delayed voltage recovery (FIDVR) on a utility grid using photovoltaic devices.

Many known electric utility grids include a plurality of interconnected known transmission and distribution (T&D) systems. Many of these known T&D systems include a plurality of interconnected regions that are geographically defined by T&D system features, for example, substation locations. In at least some known T&D regions, a significant concentration of known induction motors are present. Many of these known induction motors have constant-torque features and low-inertia characteristics. Examples of such constant-torque, low-inertia induction motors include residential and commercial air-conditioner (A/C) compressor motors. Moreover, many of these known residential A/C compressor motors are commercially sold without undervoltage (UV) protection. Significant penetration of such known induction motors into residential neighborhood and commercial regions of local T&D systems at least partially determine a T&D system's vulnerability to a fault-induced delayed voltage recovery (FIDVR) event.

FIDVR events are cascading events that are initiated by an electrical fault occurring on at least one portion of the T&D system. Such electrical faults typically automatically initiate fault-clearing features of the T&D system that quickly isolate the fault within approximately three cycles, however, the voltage of a region of the T&D system may remain at a significantly reduced level for several seconds after the fault has been cleared. The extended period of voltage depression is typically caused by high concentrations of induction motor loads with constant torque and low inertia that begin to slow down and have flux collapse substantially simultaneously with the voltage reduction and may slow down sufficiently to stall under their associated loading. These induction motors are sometimes referred to as "stall-prone" induction motors and the stalled condition is sometimes referred to as a "locked-rotor" condition. As these induction motors slow down, they draw increased reactive power from the T&D system. Moreover, such stalled induction motors require approximately 5 to 6 times their steady-state operating current during locked-rotor conditions. However, the increased current at low voltage conditions may not unstall the motor, that is, the rotor will not be released from the locked-rotor condition.

The heavy locked-rotor current demands on the T&D system result in T&D system voltage remaining significantly depressed for a period of time, typically a few seconds, after the fault is cleared, thereby leading to a first cascading effect, i.e., a cascading voltage collapse through adjacent portions of the interconnected T&D system that may extend further through the utility power grid.

A second cascading effect includes a response to the real and reactive power demands on the electric power generators coupled to that portion of the T&D system. If voltages stay depressed long enough, the associated generators trip or, alternatively, over-excitation limiting devices limit and/or reduce reactive power generation, thereby facilitating further voltage reductions and a possible system-wide voltage collapse.

A third cascading effect includes the stalled induction motors drawing the increased current such that they are removed from service by thermal protection devices with an inverse time-current characteristic that is usually set for 3-20 seconds. The combined effect of larger induction motors and smaller induction motors tripping over such a short period of time may result in significant load loss, as can the loss of generation described above, with a potential effect of a voltage recovery overshoot inducing a high-voltage condition. Depending on the size of the region affected, the associated load reduction may extend from a few kilowatts (kW) up to hundreds of megawatts (MW).

At least some known T&D systems may be configured to receive retrofit protection systems that facilitate clearing faults more quickly, however, FIDVR events that are initiated within as little as 3 cycles will not be prevented. Also, at least some known T&D systems may be configured to receive installed reactive power sources, for example, large capacitor banks. Further, at least some known T&D systems may be resectionalized to further limit faults to smaller portions of the affected T&D system. However, these two potential solutions require extended time periods to design, construct, and install and in general, may not be sufficient to mitigate FIDVR events. They also require large physical footprints, significant capital investment, and long-term operational and maintenance costs. Moreover, at least some known T&D systems may be configured to receive retrofit UV load shedding schemes to trip stall-prone loads as soon as possible once the fault condition is detected, however, such load shedding schemes typically require at least partial power outages to some portions of the T&D system. Another potential long-term solution includes promotion of unit-level replacements of existing stall-prone A/C units with A/C units that include UV protection. This solution may take decades to implement and may encounter significant public reluctance to pay more for residential A/C units, thereby extending the time horizon for substantial implementation.

BRIEF DESCRIPTION OF THE INVENTION

In one aspect, a method of assembling a motor stall correction system is provided. The method includes coupling an inverter-based electric power generation device to an electric power inverter assembly. The method also includes coupling the electric power inverter assembly to at least one induction motor. The method further includes operatively coupling at least one controller to the electric power inverter assembly. The controller is programmed to transmit electric current from the inverter-based electric power generation device to the electric power inverter assembly. The controller is also programmed to transmit real current and reactive current from the electric power inverter assembly to the induction motor. The controller is further programmed to modulate the real current and the reactive current as a function of at least one of an electric power grid frequency and an electric power grid voltage.

In another aspect, an electric power grid support system is provided. The electric power grid support system is coupled to a portion of an electric power grid. The electric power grid support system includes an electric power delivery system that includes at least one inverter-based electric power generation device. The electric power delivery system also includes an electric power inverter assembly coupled to the inverter-based electric power generation device. The electric power grid support system also includes at least one processor operatively coupled to the electric power inverter assembly. The processor is programmed to transmit at least one signal to the electric power inverter assembly to inject at least one of real current and reactive current into the portion of the electric power grid during periods of low voltage conditions at least partially resulting from a fault-induced delayed voltage recovery (FIDVR). The processor is also programmed to modulate the real current and the reactive current as a function of at least one electric power grid condition feedback signal.

In yet another aspect, a controller for use in facilitating control of a fault-induced delayed voltage recovery (FIDVR) on an electric power grid is provided. The controller includes a memory device configured to store at least one of a frequency of the electric power grid and a voltage of the electric power grid. The controller also includes a processor coupled to the memory device. The processor is programmed to transmit electric current from an inverter-based electric power generation device to an electric power inverter assembly. The processor is also programmed to transmit real current and reactive current from the electric power inverter assembly to the portion of the electric power grid. The controller further includes a communication interface coupled to the processor and the electric power inverter assembly. The communication interface is configured to transmit an operational adjustment to the electric power inverter assembly to modulate the real current and the reactive current as a function of at least one of the electric power grid frequency and the electric power grid voltage.

DETAILED DESCRIPTION OF THE INVENTION

The embodiments described herein provide an electric power grid support system. An inverter-based fault-induced delayed voltage recovery (FIDVR) system is implemented in the hardware and software of the electric power grid support system to reduce an extent and duration of voltage dips on the electric power grid to facilitate early avoidance of, and recovery from, FIDVR events. The embodiments described herein use a photovoltaic (PV) device, such as a roof-top residential solar panel, physically located in close vicinity to air-conditioning (A/C) compressor-drive induction motors. In one embodiment, the grid support system uses inputs that include grid frequency and grid voltage to determine an optimum amount of real current and reactive current to inject into the grid to provide sufficient torque on stalled induction rotors to facilitate release from a locked-rotor, or stalled condition, including induction motors approaching stall conditions. In another embodiment, the grid support system includes an additional inverter-based, secondary power source electrically coupled in parallel with the PV device. Such secondary power source may include any combination of capacitive storage, battery storage, and/or inertial storage, thereby increasing current injection into the electric power grid and/or extending a period of time that the grid support system is injecting electric power into the grid. In additional embodiments, the grid support system includes more sophisticated controls implemented therein and additional inputs that include grid support system voltages, currents, temperatures, external commands, artificial intelligence, inverter and PV device drive features that increase current transmitted therethrough, and inductive motor load conditions.

A technical effect of the electric power grid support system and the inverter-based, e.g., PV FIDVR system implemented therein is to reduce the extent and duration of voltage dips on the electric power grid to facilitate early avoidance of, and recovery from, FIDVR events. Such technical effect is achieved by inputs that include grid frequency and grid voltage to determine an optimum amount of real current and reactive current to inject into the grid to provide sufficient torque on stalled induction rotors to break out of a locked, or stalled condition. Another technical effect of the grid support system is to increase voltage support of localized induction motor loads and thereby decreasing demands for reactive current support from the grid. A further technical effect of the grid support system is to increase a margin to system voltage collapse and generator protective actions. Another technical effect is to decrease a potential for extended voltage dips on the grid that induce larger induction motor loads to trip, thereby decreasing a potential for large voltage recovery overshoots.

Figure 1:
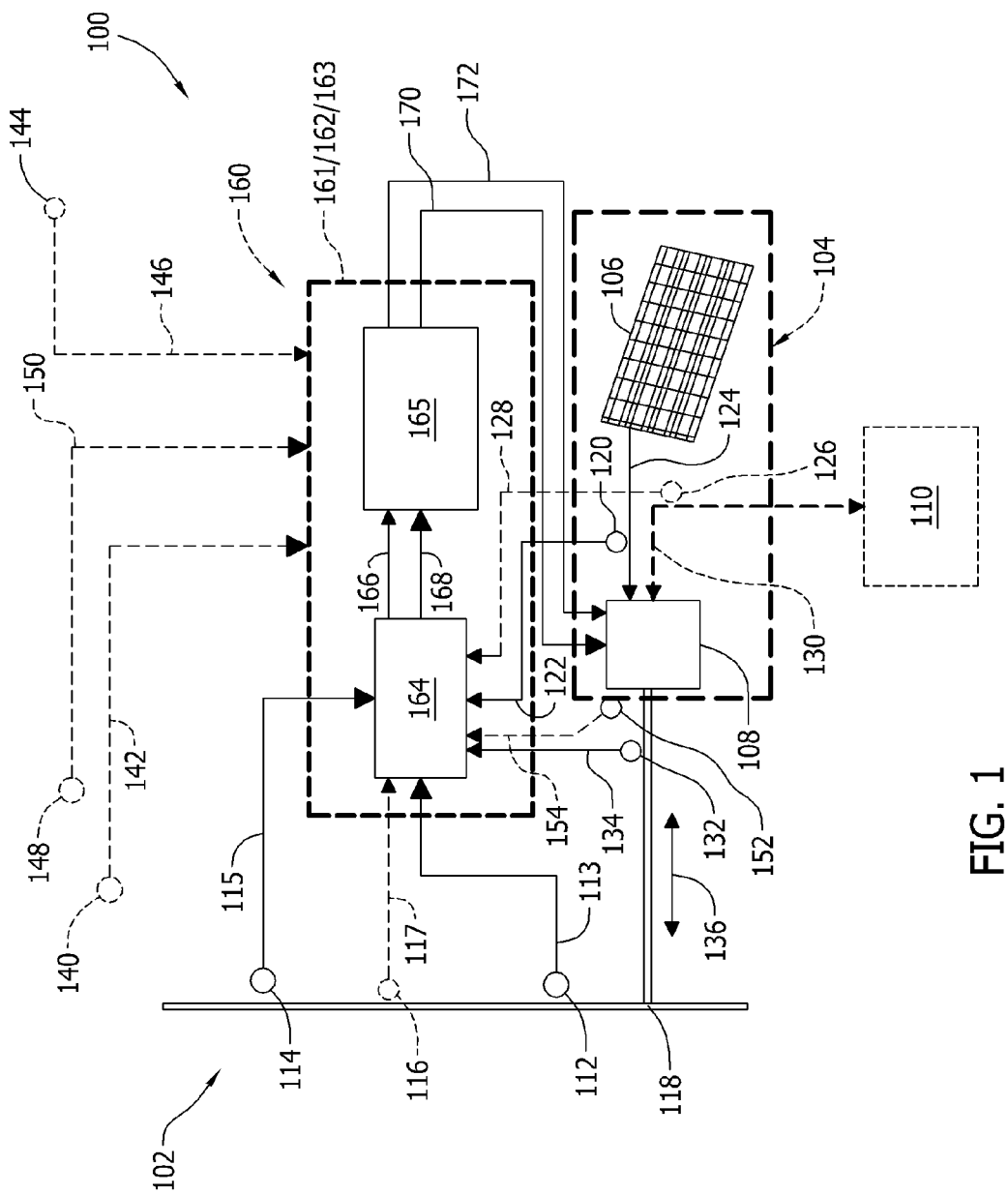
FIG. 1 is a schematic view of an exemplary electric power grid support system.

FIG. 1 is a schematic view of an exemplary electric power grid support system 100, hereon interchangeably referred to as grid support system 100. In the exemplary embodiment, grid support system 100 is a motor stall correction system. Alternatively, grid support system 100 is used for any grid condition that enables operation of grid support system 100 as described herein. In the exemplary embodiment, grid support system 100 is electrically coupled to an electric power grid 102. Electric power grid 102 includes at least one localized, interconnected transmission and distribution (T&D) system (not shown). Also, in the exemplary embodiment, grid support system 100 includes an inverter-based, i.e., photovoltaic (PV) electric power delivery system 104. PV electric power delivery system 104, hereon interchangeably referred to as PV delivery system 104, includes a PV electric power generation device 106, hereon interchangeably referred to as PV generation device 106, and an electric power inverter assembly 108, hereon interchangeably referred to as inverter assembly 108. PV generation device 106 and inverter assembly 108 are electrically coupled together, and inverter assembly 108 is electrically coupled to electric power grid 102. Alternatively, grid support system 100 includes any inverter-based generation devices including, without limitation, storage batteries (including electric vehicle storage batteries) and capacitive storage.

In the exemplary embodiment, PV generation device 106 is any photovoltaic device that uses illumination by solar radiation to generate direct current (DC) power that enables operation of grid support system 100 as described herein. For example, PV generation device 106 is a roof-top residential solar panel, physically located in close proximity to an air-conditioning (A/C) compressor-drive induction motor (not shown) also located at the residence. However, grid support system 100 is upwardly scalable from supporting a single induction motor to supporting inductive devices of any size and any number on electric power grid 102. In general, smaller embodiments of grid support system 100 that are easily embedded in existing residential system solar panel-A/C systems facilitate low-cost mass production and installation of system 100 and acceptance by residential and commercial consumers. Moreover, smaller embodiments of grid support system 100 facilitate close proximity of system 100 to the affected induction motor loads, thereby facilitating more rapid responses. An effectiveness of grid support system 100 may be further facilitated by islanding of predetermined portions of electric power grid 102, i.e., isolation of a specific portion of a localized T&D system, such that at least partial localized voltage support is facilitated. Therefore, as used herein, coupling electric power inverter assembly 108 to at least one induction motor refers to coupling grid support system 100 to a localized portion of the T&D system on electric power grid 102.

As used herein, the term "insolation" is a measure of solar radiation energy received on a given surface area in a given time. In the case of photovoltaics it is commonly expressed as average illumination in terms of kilowatt-hours per year per kilowatt peak rating [kW-h/(kWp-y)], watts per square meter ($W/m^2$), or kilowatt-hours per square meter per day ($kW-h/(m^2-day)$). PV generation device 106 has any electrical ratings that enable operation of grid support system 100 as described herein Also, in the exemplary embodiment, inverter assembly 108 is any electric power conversion device that converts DC power to alternating current (AC) power with firing devices (not shown) that include, without limitation, insulated gate bipolar transistors (IGBTs) and gate turn-off (GTO) thyristors (neither shown). Further, in the exemplary embodiment, inverter assembly 108 is a four-quadrant inverter. Such four-quadrant inverter is configured to operate in all four quadrants typically graphically represented by positive and negative voltages and currents (not shown). Therefore, inverter assembly 108 facilitates four-quadrant power flow therethrough. Alternatively, inverter assembly 108 is any inverter assembly that has any electrical ratings that enable operation of grid support system 100 as described herein including, without limitation, a two-quadrant inverter configured to transmit positive real current and positive and/or negative reactive current, and a single-quadrant inverter configured to transmit positive real current and positive reactive current. Moreover, such an optimum injection of real current and reactive current as described herein is generated by a variety of inverter assembly control schemes and topologies including, without limitation, current controlled source schemes and voltage controlled source schemes.

Grid support system 100 may include at least one secondary power source 110 (shown in phantom) electrically coupled to inverter assembly in parallel with PV generation device 106. Secondary power generation source 110 includes any power generation devices and/or power storage devices that enable operation of grid support system 100 as described herein including, without limitation, capacitive storage, battery storage, fuel cell storage, and inertial storage. Moreover, alternatively, such secondary power generation source 110 may include alternating current (AC) devices that are suitable for coupling to the distribution portion (not shown) of electric power grid 102. Such AC devices may include, without limitation, small gasoline generators, small diesel generators, and small wind generators that are typically associated with residences and small businesses. These AC devices would also include a converter device, such as a diode rectifier (not shown) coupled between secondary power generation source 110 and electric power inverter assembly 108 such that the power input from source 110 is compatible with inverter assembly 108. Furthermore, such gasoline, diesel, and wind generators, as well as such capacitive, battery, fuel cell, and inertial storage, may be scalable for larger residences and businesses including, without limitation, large industrial facilities.

Secondary power source 110 is configured to increase electric current injection into electric power grid 102 and/or extend a period of time that grid support system 100 is injecting electric current into electric power grid 102. Also, secondary power source 110 has any electrical ratings that enable operation of grid support system 100 as described herein. Further, secondary power source 110, and multiple additions thereof, facilitate the scalability of grid support system 100.

Grid support system 100 includes at least one grid voltage measurement device 112 coupled to electric power grid 102. Grid voltage measurement device 112 is any device that generates and transmits a grid voltage signal 113 and that enables operation of grid support system 100 as described herein including, without limitation, voltage transducers. Grid support system 100 also includes at least one grid frequency measurement device 114 coupled to electric power grid 102. Grid frequency measurement device 114 is any device that generates and transmits a grid frequency signal 115 and that enables operation of grid support system 100 as described herein including, without limitation, frequency transducers.

Grid support system 100 may include at least one grid current measurement device 116 (shown in phantom) coupled to electric power grid 102. Grid current measurement device 116 is any device that generates and transmits a grid current signal 117 (shown in phantom) and that enables operation of grid support system 100 as described herein including, without limitation, current transducers and transformers. In the exemplary embodiment, measurement devices 112, 114, and 116 are positioned in the near-vicinity of a portion of, i.e., a junction 118 of grid support system 100 and electric power grid 102 to facilitate generating signals 113, 115, and 117, respectively, such that representation of localized grid conditions is facilitated. Alternatively, measurement devices 112, 114, and 116 are positioned anywhere that enables operation of grid support system 100 as described herein.

Grid support system 100 also includes at least one PV current measurement device 120 coupled to PV generation device 106. PV current measurement device 120 is any device that generates and transmits a PV current signal 122 representative of a unidirectional current 124 and that enables operation of grid support system 100 as described herein including, without limitation, current transducers and transformers. Grid support system 100 may further include at least one secondary power source current measurement device 126 coupled to secondary power source 110. Secondary power source current measurement device 126 is any device that generates and transmits a secondary power source current signal 128 (shown in phantom) representative of a bidirectional current 130 (shown in phantom) and that enables operation of grid support system 100 as described herein including, without limitation, current transducers and transformers. Grid support system 100 also includes at least one inverter current measurement device 132 coupled to inverter assembly 108. Inverter current measurement device 132 is any device that generates and transmits an inverter assembly current signal 134 representative of an inverter assembly current 136 that enables operation of grid support system 100 as described herein including, without limitation, current transducers and transformers.

Grid support system 100 may include an electric power grid communications device 140 (shown in phantom) that facilitates transmission of two-way communications signals 142 (shown in phantom) between a grid operator (not shown) and grid support system 100. Such communications signals 142 include, without limitation, remote grid conditions and operator-selected start and stop commands. Grid support system 100 may also include at least one induction motor load communications device 144 (shown in phantom) that facilitates transmission of induction motor load condition signals 146 (shown in phantom) between grid support system 100 and a predetermined induction motor load, for example, and without limitation, a large induction motor and a bank of small air-conditioning (A/C) induction motors. Such induction motor load condition signals 146 include, without limitation, an off/on status of the motors, inertial forces of the rotor of an induction motor, and a terminal voltage at the motor windings. Grid support system 100 may further include at least one external control device 148 (shown in phantom) that facilitates transmission of external control signals 150 (shown in phantom) from any external control device to grid support system 100. Such external control signals 150 include, without limitation, system enablement signals, system actuation signals, and system actuation blocking signals. Grid support system 100 may also include at least one PV delivery system status device 152 (shown in phantom) that facilitates transmission of PV delivery system status signals 154 (shown in phantom) from PV generation device 106 and inverter assembly 108. Such PV delivery system status signals 154 include, without limitation, voltages and temperatures of individual PV cells (not shown) in PV generation device 106 and individual firing devices (not shown) in inverter assembly 108.

In the exemplary embodiment, grid support system 100 is fully enabled to operate as described herein with grid voltage signal 113, grid frequency signal 115, PV current signal 122, and inverter assembly current signal 134 as inputs. Such a control system architecture defines a quasi-open loop system that uses grid frequency and voltage as the primary variables to control an induction motor load that is not monitored. Additional instrumentation, as described above, may be used to supplement operation of grid support system 100 as described herein.

In the exemplary embodiment, grid support system 100 includes at least one controller 160 or other processors configured to execute control algorithms and control logic. Controller 160 includes at least one processor 161, a memory device 162 coupled to processor 161, and a communication interface 163 coupled to processor 161 and memory device 162. Communication interface 163 is coupled to at least one processor input channel, and at least one processor output channel (each discussed further below). As used herein, the term "processor" includes any programmable system including systems and microcontrollers, reduced instruction set circuits (RISC), application specific integrated circuits (ASIC), programmable logic circuits, and any other circuit capable of executing the functions described herein. The above examples are exemplary only, and thus are not intended to limit in any way the definition and/or meaning of the term processor. Moreover, as used herein, the term "processor" is not limited to integrated circuits referred to in the art as a computer, but broadly refers to a microcontroller, a microcomputer, a programmable logic controller (PLC), an application specific integrated circuit, and other programmable circuits, and these terms are used interchangeably herein.

In the embodiments described herein, memory device 162 may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. In the embodiments described herein, additional input channels may include, without limitation, computer peripherals associated with an operator interface such as a mouse and a keyboard. Alternatively, other computer peripherals may also be used that may include, for example, without limitation, a scanner. Additional output channels may include, without limitation, an operator interface monitor. RAM and storage devices store and transfer information and instructions to be executed by the processor. RAM and storage devices can also be used to store and provide temporary variables, static (i.e., non-changing) information and instructions, or other intermediate information to the processors during execution of instructions by the processors. Instructions that are executed may include, without limitation, resident security system control commands. The execution of sequences of instructions is not limited to any specific combination of hardware circuitry and software instructions.

Processors 161 as described herein process information transmitted from a plurality of electrical and electronic components via communication interface 163. Such information may include, without limitation, voltage signals, frequency signals, and current signals. In the exemplary embodiment, controller 160 is positioned proximate PV delivery system 104. Alternatively, controller 160 is positioned any place that enables operation of grid support system 100 as described herein including, without limitation, in a remote enclosure (not shown) positioned some distance from PV delivery system 104. Further, in some embodiments, controller 160 includes, without limitation, those processors resident within personal computers, remote servers, PLCs, distributed control system (DCS) cabinets, and hand-held Internet-enabled devices.

In the exemplary embodiment, controller 160 is operatively coupled to grid voltage measurement device 112 and grid frequency measurement device 114. Controller 160 may also be operatively coupled to additional devices that include grid current measurement device 116, PV current measurement device 120, secondary power source current measurement device 126, inverter current measurement device 132, electric power grid communications device 140, induction motor load condition communications device 144, external control device 148, and PV delivery system status device 152.

Also, in the exemplary embodiment, processor 161 includes at least two functional logic blocks programmed therein. A first functional logic block 164 includes sufficient programming to determine a current injection angle to facilitate injecting real and reactive current into electric power grid 102. A second functional logic block 165 is operatively coupled to first functional logic block 164 and includes sufficient programming to determine real and reactive current injection values at least partially as a function of a power injection angle determined by logic block 164. First and second functional logic blocks 164 and 165, respectively, are programmed to respond dynamically to varying inputs as described further below.

Communication interface 163 of controller 160 receives input signals that include, without limitation, grid voltage signal 113 transmitted from voltage measurement device 112, grid frequency signal 115 transmitted from frequency measurement device 114, PV current signal 122 transmitted from PV current measurement device 120, and inverter assembly current signal 134 transmitted from inverter current measurement device 132. Signals 113, 115, 122, and 134 are transmitted from communication interface 163 to memory device 162, wherein such signals are at least temporarily stored therein. Signals 113, 115, 122, and 134 are transmitted from memory device 162 to first functional logic block 164 of processor 161. First functional logic block 164 determines a plurality of signals that include, without limitation, a total current demand signal 166 and a power injection angle signal 168. Total current demand signal 166 is representative of the total electric power current value that grid support system 100 is required to inject into electric power grid 102 to facilitate at least a partial recovery from a grid voltage transient that may result in a cascading FIDVR event. Power injection angle signal 168 is representative of an apportionment of total current demand into real power current demand and reactive current demand. Therefore, first and second functional logic blocks 164 and 165, respectively, and any other programming within processor 161, represent implementation of a photovoltaic (PV) fault-induced delayed voltage recovery (FIDVR) system in grid support system 100.

Total current demand signal 166 and a power injection angle signal 168 are received by second functional logic block 165 that determines a real current injection signal 170 and a reactive current injection signal 172. Real current injection signal 170 and reactive current injection signal 172 are transmitted to inverter assembly 108 via communication interface 163. Inverter assembly 108 modulates reactive current injection and real current injection (neither shown) into electric power grid 102 at junction 118 as a function of real current injection signal 170 and reactive current injection signal 172. Typically, due to the speed (as quickly as three cycles) and desired brevity of grid undervoltage transients, and the desire to avoid a FIDVR event, total current demand signal 166 is a function of predetermined rating parameters of inverter assembly 108 and PV generation device 106 including, without limitation, current ratings and temperature ratings of the associated firing devices and solar cells (neither shown), respectively. Such equipment rating parameters, without limitation to those described above, are programmed into processor 161. Therefore, in the exemplary embodiment, inverter assembly 108 is typically commanded to convert DC current generated by, and temporarily stored within, PV generation device 106 into alternating current (AC), i.e., inverter assembly current 136 at current values that are near, or at maximum current parameters of inverter assembly 108 and PV generation device 106. Also, in the exemplary embodiment, inverter assembly current 136 includes real current and reactive current apportioned as a function of power injection angle signal 168. Moreover, in the exemplary embodiment, power injection angle signal 168 is modulated as a function of time to modulate the apportionment of the real current and reactive current components (not shown) of inverter assembly current 136.

At least some embodiments of grid support system 100 include sufficient programming to receive PV delivery system status signals 154 from PV delivery system status device 152 that include, without limitation, voltages of individual PV cells (not shown) in PV generation device 106. In addition, such embodiments of grid support system 100 include sufficient programming to modulate inverter assembly current 136 to facilitate maintaining a predetermined margin to low voltage ratings of the individual PV cells such that the commanded inverter assembly current 136 is sufficient to support a grid voltage recovery. Moreover, some embodiments of grid support system 100 also include sufficient programming to facilitate an "overdrive mode" of operation of PV electric power delivery system 104. Such overdrive mode facilitates driving PV generation device 106 and electric power inverter assembly 108 to generate commanded injection current in excess of those current parameters determined as a function of, without limitation, predetermined voltage parameters and temperature parameters, for a predetermined period of time. Such overdrive mode features may be extended to include other components of grid support system 100 including, without limitation, inverter assembly 108 and secondary power source 110.

Also, at least some embodiments of grid support system 100 include sufficient programming in processor 161 and appropriately selected PV cell architecture and materials to generate electric power using latent energy residing within individual PV cells in addition to the electric power generated through insolation. Such post-insolation generation facilitates short-term extraction of electric power from grid support system 100 via standard PV generation and more exotic methods of generation to enable and facilitate operation of grid support system as described herein, e.g., controlling a switching frequency of the firing devices in inverter assembly 108 as discussed further below.

Further, at least some embodiments of grid support system 100 include sufficient programming in processor 161 to facilitate operation of secondary power source 110 in parallel with, or instead of, PV generation device 106. In such embodiments, control of secondary power source current 130 is substantially similar to that described above for PV generation device 106 and inverter assembly 108 including, more aggressive and/or effective control of grid voltage restoration efforts.

Moreover, at least some embodiments of grid support system 100 include sufficient programming in processor 161 to facilitate transmission of two-way communications signals 142 between a grid operator and grid support system 100. Such communications signals 142 include, without limitation, remote grid conditions and local operator-selected start and stop commands. For example, a remote grid operator may have notice of a pending fault-induced grid voltage transient and may request a local operator to command grid support system 100 into a ready status the remote grid operator may monitor the change in status via communications signals 142.

Also, at least some embodiments of grid support system 100 include sufficient programming in processor 161 to facilitate transmission of induction motor load condition signals 146 between grid support system 100 and a predetermined induction motor load, for example, and without limitation, a large induction motor and a bank of small air-conditioning (A/C) induction motors. Such induction motor load condition signals 146 include, without limitation, an off/on status of the motors and a terminal voltage at the motor windings. For example, such embodiments of grid support system 100 may be electrically coupled to electric power grid 102 such that junction 118 is geographically near the affected induction motors. The close vicinity facilitates such embodiments of grid support system 100 to monitor and provide voltage recovery support to predetermined induction motor loads. At least some of such embodiments of grid support system 100 include sufficient devices at the predetermined induction motor loads to monitor variables other than terminal voltage thereof. For example, without limitation, such devices include current monitoring, motor rotor inertial load force monitoring, and slip monitoring of induction motors that facilitate reducing a potential for a motor stall. Also, for example, forces on the induction motor rotor inertia may be induced to facilitate at least one of unstalling the rotor and preventing stalling of the rotor. As used herein, the term "unstall" and "unstalling" refers to releasing a rotor from a locked-rotor condition as described herein. Also, as used herein, the term "inertial forces" refers to those forces acting on a rotor's inertia including, without limitation, stator-to-rotor air gap-induced forces.

Further, at least some embodiments of grid support system 100 include sufficient programming in processor 161 to facilitate transmission of external control signals 150 from any external control device to grid support system 100. Such external control signals 150 include, without limitation, system enablement signals, system actuation signals, and system actuation blocking signals. For example, a plurality of grid support systems 100 may be geographically positioned to each other such that some grid support systems 100 may be enabled to a stand-by condition, some grid support systems 100 may be placed into service, and some grid support systems 100 may be blocked from operating due to technical reasons isolated to each particular grid support system 100, for example, maintenance activities.

Moreover, at least some embodiments of grid support system 100 include sufficient programming in processor 161 to facilitate generation of proxy signals (not shown) that are representative of certain input signals to controller 160 including, without limitation, induction motor slip conditions. Also, at least some embodiments of grid support system 100 include sufficient programming in processor 161 to facilitate use of self-learning and/or artificial intelligence features that facilitate specific tuning of grid support system 100 to facilitate specific control responses to specific grid and/or system conditions. For example, hysteresis properties of various components within grid support system 100 and the associated induction motor loads facilitate at least a short-term memory mechanism due to a predetermined response lag, or delay to a predetermined varying input. Such hysteresis properties result in dependent variables, such as rotor torque in an induction motor, to exhibit different values according to whether the independent variable, for example, terminal voltage at the motor, is increasing or decreasing. The effect depends not only on the present value of the independent variable, i.e., terminal voltage, but also on the previous value of the independent variable, thereby inducing a historical dependence of the dependent variable, i.e., rotor torque, on the independent variable.

Also, at least some embodiments of grid support system 100 include sufficient programming in processor 161 to facilitate controlling the switching frequency of the firing devices, e.g., the IGBTs in inverter assembly 108. Switching at lower frequencies may tend to increase electrical harmonics at frequencies other than 60 Hertz (Hz). However, decreasing the switching frequency of inverter assembly 108 facilitates greater fundamental frequency current values, i.e., real and reactive current signals at 60 Hz. Moreover, switching at higher frequencies tends to increase a rate of heat generation therein, and switching at lower frequencies, for at least short periods of time, facilitates decreasing heat generation in the firing devices while increasing the total current injected from grid support system 100.

Figure 2:
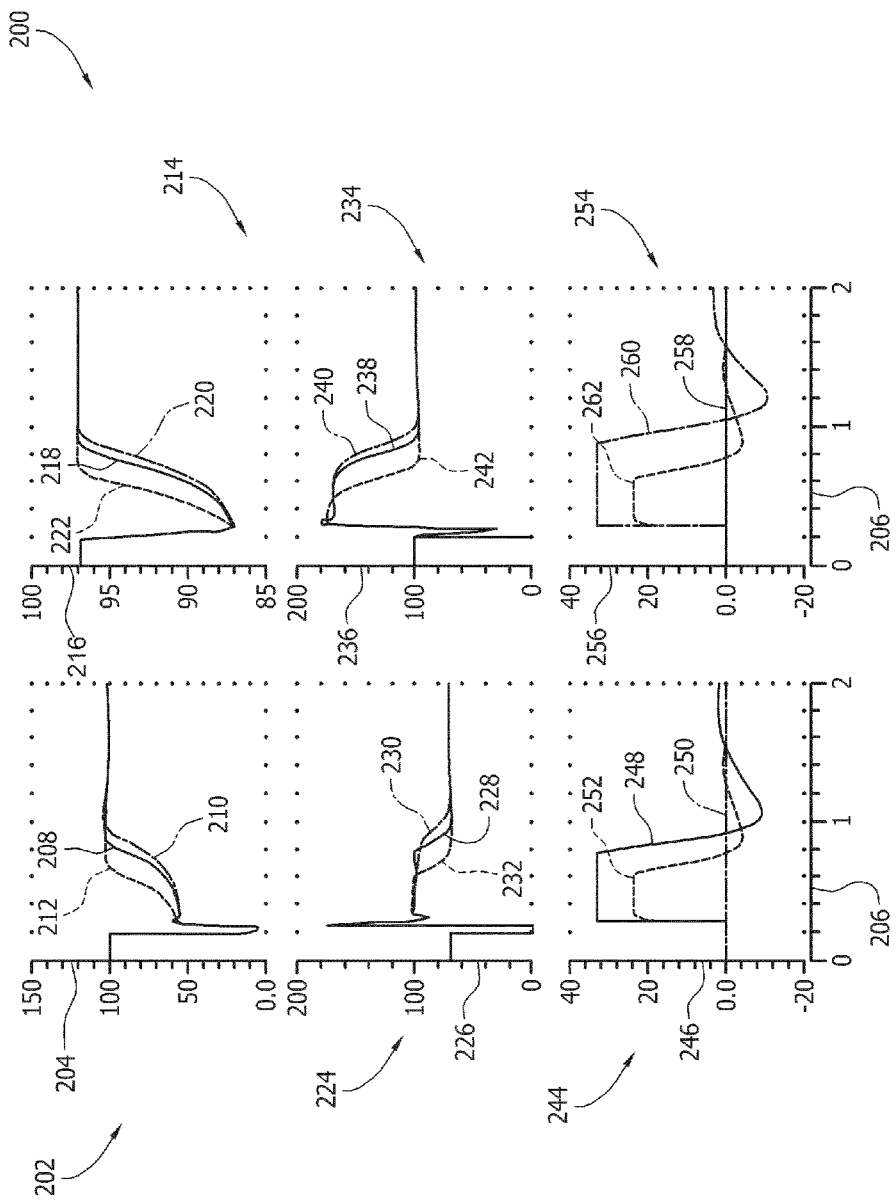
FIG. 2 is a plurality of graphical views of exemplary voltage, real current, reactive current, and speed of an induction motor as a function of time using the electric power grid support system shown in FIG. 1.

FIG. 2 is a plurality of graphical views 200 of exemplary voltage, real current, reactive current, and speed of an induction motor (not shown) as a function of time using grid support system 100 (shown in FIG. 1).

In general, an induced torque on an induction motor rotor is proportional to a generated power in an air gap extending between the rotor and the stator. Also, the induced torque is indirectly proportional to the system frequency. Further the generated air gap power is proportional to a square of the stator current and is indirectly proportional to the motor slip. Therefore, in general, since slip may vary greatly and system frequency will likely vary little, to prevent an induction motor from stalling, or to unstall an induction motor as described herein, increasing the amount of electric current injected to the motor stator winding is typically the method used. Moreover, a separate current injection device, for example, grid support system 100, may be used to inject sufficient electric current to unstall the motor. Also, in general, the greater the value of the current injected by the device, the greater the probability of avoiding or correcting a motor stall. Also, in general, the total current transmitted into the motor stator is a sum of the current injected by the device and the current supplied by the electric power grid. Furthermore, determined reactances that make up a system-equivalent impedance including, without limitation, motor winding impedances, are functions of a fundamental system frequency, i.e., 50 Hz or 60 Hz.

Therefore, the total current transmitted into the motor stator is a function of variables that include motor slip, motor stator terminal voltage, current injected by the injection device, i.e., grid support system 100, variations of system frequency from 50 Hz or 60 Hz, and an apportionment of injected current into real and reactive current components, i.e., the current injection angle. The variables that are difficult to control include motor stator terminal voltage (primarily determined by the grid), motor slip (at least partially determined by grid frequency and motor rotor inertia), grid frequency, and real and reactive currents supplied by the grid. The variables that facilitate control are injection current 136 and the associated current injection angle.

In the exemplary embodiment, grid support system 100 is rated to inject inverter assembly current 136 (shown in FIG. 1) at a value that is approximately 33% of a rated current draw of a fully-loaded induction motor stator (not shown). In general, each of graphical views 200 uses a solid line to show a response with only reactive current injected, a dashed/dotted line to show a response with only real current injected, and a dashed line to show a response with real and reactive currents injected.

Graphical views 200 include a first graph 202 that represents motor terminal voltage as a function of time during a grid voltage transient/current injection event. Graph 202 includes a y-axis 204 representing terminal voltage in units of percent (%) in increments 10% and extending from 0.0% to 150%. Graph 202 also includes an x-axis 206 representing time in units of seconds in increment of 0.2 seconds and extending from 0 to 2 seconds. Graph 202 further includes a reactive current curve 208, a real current curve 210, and a real and reactive current curve 212. In the exemplary embodiment, for those cases that used a combination of real and reactive currents, a constant current injection angle of 45° is selected to apportion each of real and reactive currents into 71% of the total current injected, that is, inverter assembly current 136. The use of a constant current injection angle is selected for illustrative purposes. However, grid support system 100 is configured to vary current injection angle as a function of measured conditions, such as, without limitation, grid voltage, grid frequency, and motor slip.

Graphical views 200 also include a second graph 214 that represents motor speed as a function of time during the grid voltage transient/current injection event. Graph 214 includes a y-axis 216 representing motor speed in units of percent (%) in increments of 10%, and extending from 85% to 100%. Graph 214 also includes x-axis 206. Graph 214 further includes a reactive current curve 218, a real current curve 220, and a real and reactive current curve 222.

Graphical views 200 further include a third graph 224 that represents motor reactive current draw as a function of time during the grid voltage transient/current injection event. Graph 224 includes a y-axis 226 representing reactive current draw in units of percent (%) in increments of 20% and extending from 0% to 200%. Graph 224 also includes x-axis 206.

Graph 224 further includes a reactive current curve 228, a real current curve 230, and a real and reactive current curve 232.

Graphical views 200 also include a fourth graph 234 that represents motor real current draw as a function of time during the grid voltage transient/current injection event. Graph 234 includes a y-axis 236 representing real current draw in units of percent (%) in increments of 20% and extending from 0% to 200%. Graph 234 also includes x-axis 206. Graph 234 further includes a reactive current curve 238, a real current curve 240, and a real and reactive current curve 242.

Graphical views 200 also include a fifth graph 244 that represents PV inverter reactive current injection as a function of time during the grid voltage transient/current injection event. Graph 244 includes a y-axis 246 representing PV inverter reactive current injection in units of percent (%) in increments of 10% and extending from −20% to 40%. Graph 244 also includes x-axis 206. Graph 244 further includes a reactive current curve 248, a real current curve 250, and a real and reactive current curve 252. Real current curve 250 remains at approximately 0.0 because only reactive current is injected from inverter assembly 108.

Graphical views 200 also include a sixth graph 254 that represents PV inverter real current injection as a function of time during the grid voltage transient/current injection event. Graph 254 includes a y-axis 256 representing PV inverter real current injection in units of percent (%) in increments of 10% and extending from −20% to 40%. Graph 254 also includes x-axis 206. Graph 254 further includes a reactive current curve 258, a real current curve 260, and a real and reactive current curve 262. Reactive current curve 260 remains at approximately 0.0 because only real current is injected from inverter assembly 108.

In the exemplary embodiment, electric power grid 102 (shown in FIG. 1) experiences a fault-induced voltage dip from approximately 100% of rated voltage to approximately 5% of rated voltage at approximately 0.2 seconds. The motor remains fully loaded during the entire transient. Grid voltage begins to recover at approximately 0.25 to 0.3 seconds, however, grid voltage recovery is slowed due to stalling of induction motor loads. Such stalling of the associated motor is indicated in second graph 214 as a decrease of rated speed to approximately 87%, an increase of reactive current draw to approximately 180% of rated as shown in third graph 224, and a decrease of real current draw to approximately 40% of rated as shown in fourth graph 234. Moreover, grid support system 100 initiates current injection at approximately 0.25 to 0.3 seconds as shown in graphs 244 and 254.

In the exemplary embodiment, for the case wherein only reactive current is injected by grid support system 100, motor terminal voltage curve 208 shows full recovery at approximately 0.8 seconds and is further shown by curves 218, 228, and 238. Curve 248 shows that reactive current injection increases to approximately 33% of the motor rating which is 100% of the rating for grid support system 100. As shown in curve 248, the injection of reactive current by grid support system 100 decreases upon grid recovery at approximately 0.8 seconds and grid support system 100 receives reactive current from approximately 0.9 seconds to approximately 1.5 seconds.

Also, in the exemplary embodiment, for the case wherein only real current is injected by grid support system 100, motor terminal voltage curve 210 shows full recovery at approximately 0.95 seconds and is further shown by curves 220, 230, and 240. Curve 260 shows that real current injection increases to approximately 33% of the motor rating which is 100% of the rating for grid support system 100. As shown in curve 260, the injection of real current by grid support system 100 decreases upon grid recovery at approximately 0.8 seconds and grid support system 100 receives real current from approximately 1.05 seconds to approximately 1.5 seconds.

Further, in the exemplary embodiment, for the case wherein real and reactive currents are injected by grid support system 100 with a current injection angle of approximately 45°, motor terminal voltage curve 212 shows full recovery at approximately 0.6 seconds and is further shown by curves 222, 232, and 242. Curves 252 and 262 both show that real and reactive current injection increases to approximately 23.5% of the motor rating which is approximately 71% of the rating for grid support system 100. As shown in curves 252 and 262, the injection of real and reactive current by grid support system 100 decreases upon grid recovery at approximately 0.6 seconds and grid support system 100 receives real and reactive current from approximately 0.85 seconds to approximately 1.3 seconds.

Therefore, injection of both real and reactive currents simultaneously decreases recovery time, decreases current injected from grid support system 100, increases a margin to rated parameters within grid support system 100, and decreases post-recovery overshoot and current transmitted into grid recovery system 100.

Figure 3:
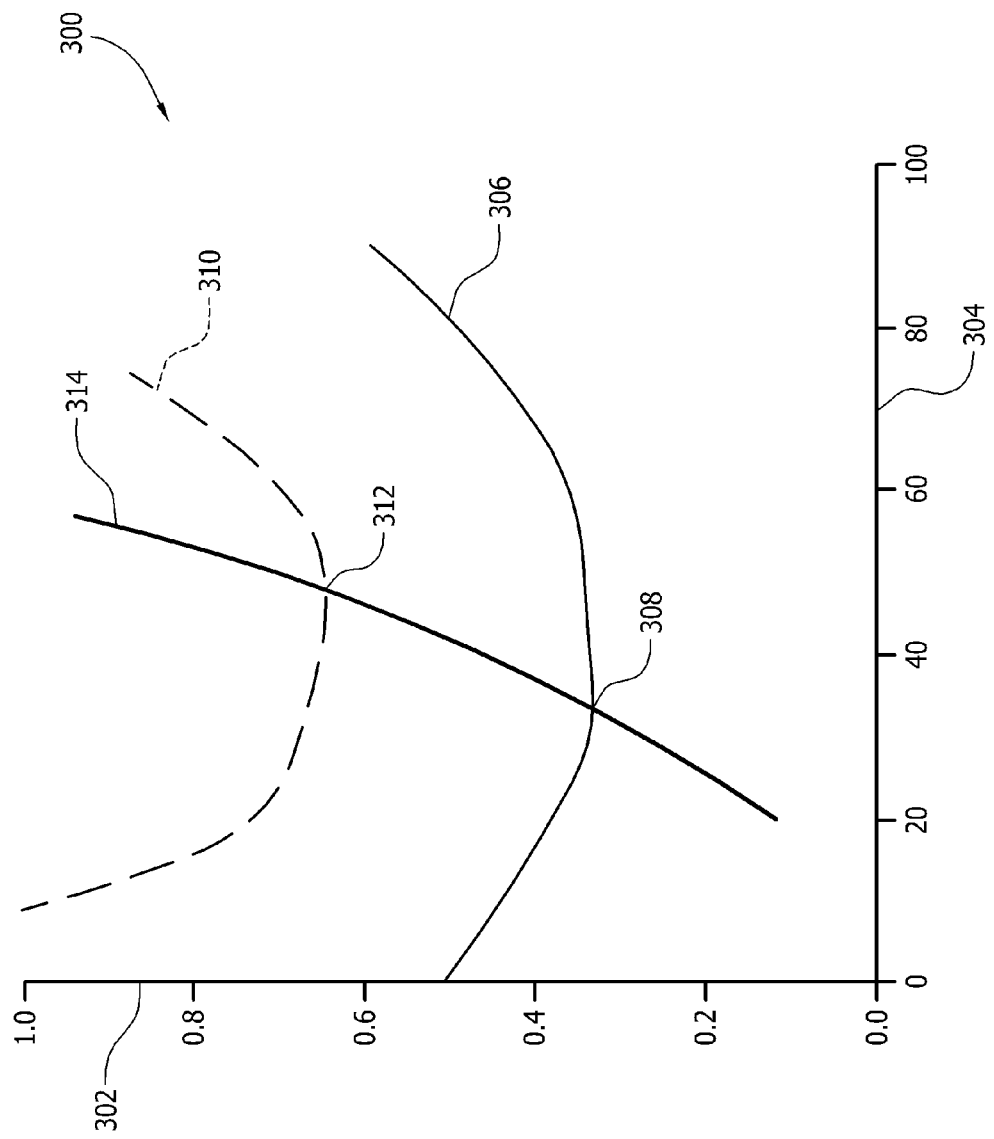
FIG. 3 is a graphical view of recovery time as a function of current injection angle.

FIG. 3 is a graphical view 300 of recovery time as a function of current injection angle. Graph 300 includes a y-axis 302 that represents recovery time is units of seconds and increments of 0.2 seconds extending from 0.0 seconds to 1.0 seconds. Graph 300 also includes an x-axis 304 that represents current injection angle in units of degrees (°) and increments of 20° extending from 0° to 100°. Graph 300 further includes a 33% motor rating curve 306, i.e., grid support system 100 is rated for approximately 33% of the associated induction motor loads. Curve 306 is substantially parabolic with a lowest value, or locus 308 positioned at a current injection angle of approximately 35° and a recovery time of approximately 0.35 seconds. Graph 300 also includes a 20% motor rating curve 310, i.e., grid support system 100 is rated for approximately 20% of the associated induction motor loads. Curve 310 is substantially parabolic with a lowest value, or locus 312 positioned at a current injection angle of approximately 47° and a recovery time of approximately 0.65 seconds. Curve 300 further includes a locus curve 314 that extends through loci 308 and 312. Therefore, curve 300 shows that both recovery time and the required current injection angle decrease significantly as a function of increased current injection ratings of grid support system 100.

Figure 4:
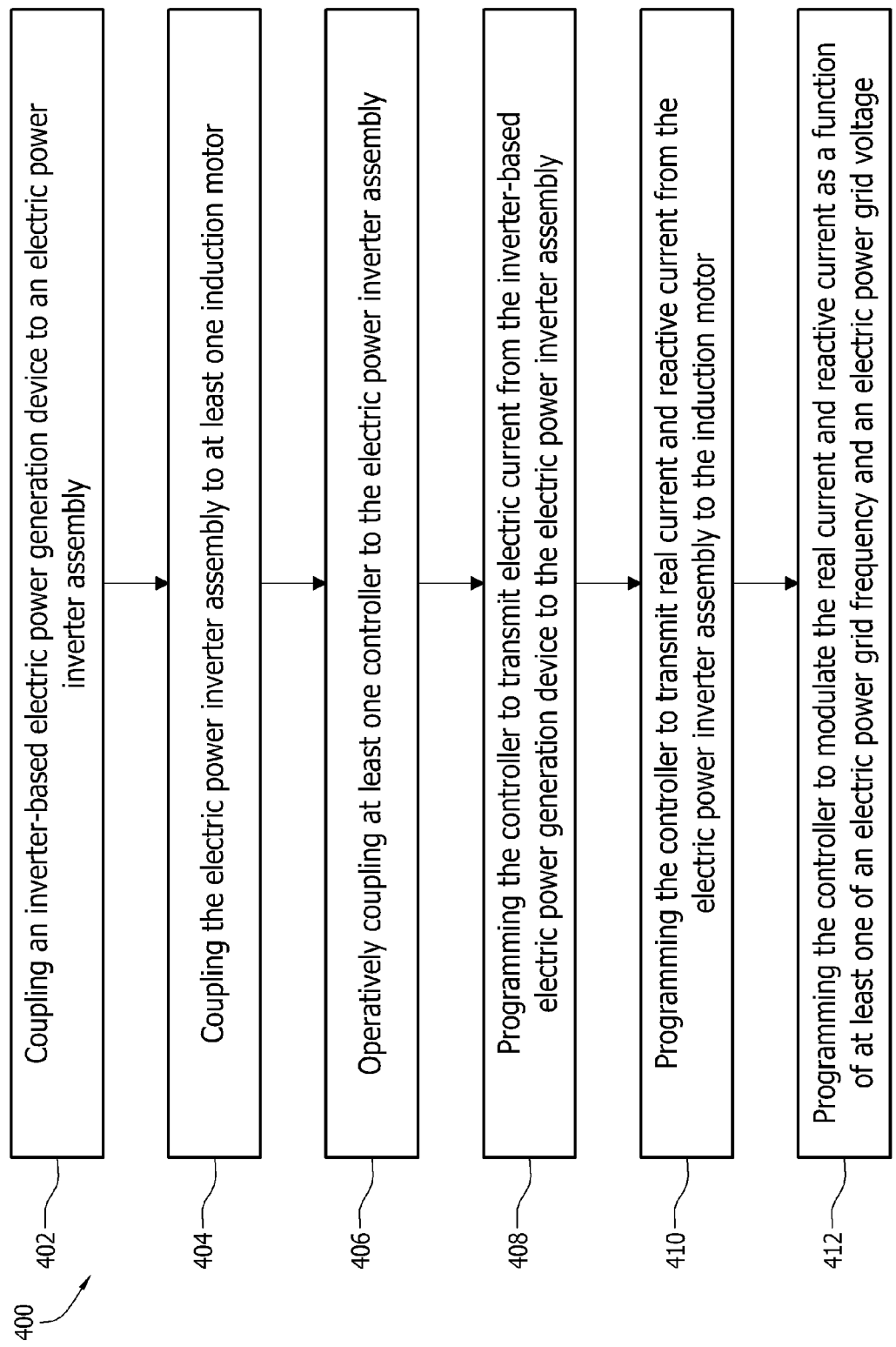
FIG. 4 is a flow diagram of an exemplary method of assembling the electric power grid support system shown in FIG. 1.

FIG. 4 is a flow diagram of an exemplary method 400 of assembling a motor stall correction system, i.e., electric power grid support system 100 (shown in FIG. 1). In the exemplary embodiment, an inverter-based, i.e., photovoltaic (PV) electric power generation device 106 (shown in FIG. 1) is coupled 402 to electric power inverter assembly 108 (shown in FIG. 1). Electric power inverter assembly 108 is coupled 404 to at least one induction motor (not shown). At least one controller 160 (shown in FIG. 1) is operatively coupled 406 to electric power inverter assembly 108. Controller 160 is programmed 408 to transmit electric current from PV electric power generation device 106 to electric power inverter assembly 108. Controller 160 is also programmed 410 to transmit real current and reactive current from electric power inverter assembly 108 to the induction motor. Controller 160 is further programmed 412 to modulate the real current and the reactive current as a function of at least one of an electric power grid frequency and an electric power grid voltage.

The embodiments described herein provide an electric power grid support system. Specifically, a photovoltaic (PV)

fault-induced delayed voltage recovery (FIDVR) system is implemented in the hardware and software of electric power grid support system to reduce an extent and duration of voltage dips on the electric power grid to facilitate early avoidance of, and recovery from, FIDVR events. Also, specifically, the embodiments described herein use a PV device, such as a roof-top residential solar panel, physically located in close vicinity to air-conditioning (A/C) compressor-drive induction motors. In one embodiment, the grid support system uses inputs that include grid frequency and grid voltage to determine an optimum amount of real current and reactive current to inject into the grid to provide sufficient torque on stalled induction rotors to facilitate release from a locked-rotor, or stalled condition. Alternatively, in other embodiments, the grid support system includes an additional power source electrically coupled in parallel with the PV device. Such power source may include any combination of capacitive storage, battery storage, and/or inertial storage, thereby increasing current injection into the electric power grid and/or extending a period of time that the grid support system is injecting electric power into the grid. Moreover, such additional power sources facilitate upward scalability of the grid support system. Further, alternatively, in additional embodiments, the grid support system includes more sophisticated controls implemented therein and additional inputs that include grid support system voltages, currents, temperatures, external commands, artificial intelligence, inverter and PV device drive features that increase current transmitted therethrough, and induction motor load conditions. Therefore, the grid support system as described herein facilitates low cost solutions to a grid-wide issue that have a reasonable potential for early, and wide-spread, adoption by residential and industrial consumers.

Exemplary embodiments of a grid support system and a method of operating the grid support system to facilitate an extended, decreasing voltage transient are described above in detail. The grid support system and method are not limited to the specific embodiments described herein, but rather, components of the grid support system and/or steps of the method may be utilized independently and separately from other components and/or steps described herein. For example, the grid support system and method may also be used in combination with other power systems and methods, and are not limited to practice with only the grid support system as described herein. Rather, the exemplary embodiment can be implemented and utilized in connection with many other grid support applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a motor stall correction system, said method comprising:
    coupling an inverter-based electric power generation device to an electric power inverter assembly;
    coupling the electric power inverter assembly to at least one induction motor, wherein the induction motor is coupled to an electric power grid;
    operatively coupling at least one controller to the electric power inverter assembly, wherein the controller is programmed to:
        transmit electric current from the inverter-based electric power generation device to the electric power inverter assembly;
        transmit real current and reactive current from the electric power inverter assembly to the induction motor; and,
        modulate the real current and the reactive current as a function of an electric power grid frequency; and,
    programming the controller to command the inverter-based electric power generation device and the electric power inverter assembly to generate and transmit the real current and the reactive current in excess of at least one of:
        inverter-based electric power generation device parameters for a predetermined period of time; and,
        electric power inverter assembly parameters for a predetermined period of time.

2. A method in accordance with claim 1, further comprising coupling at least one additional electric power generation device to the electric power inverter assembly in parallel with the inverter-based electric power generation device.

3. A method in accordance with claim 1, further comprising programming the controller to:
    sense electric power grid conditions that induce stalling of the induction motor; and,
    command the electric power inverter assembly to initiate real and reactive power injection.

4. A method in accordance with claim 3, wherein programming the controller to sense electric power grid conditions that induce stalling of the induction motor comprises programming the controller to sense low voltage conditions on the electric power grid at least partially resulting from a fault-induced delayed voltage recovery (FIDVR).

5. A method in accordance with claim 1, further comprising programming the controller to modulate the real current and the reactive current as a function of slip conditions of the induction motor.

6. A method in accordance with claim 1, further comprising programming the controller to modulate injection of the real current and the reactive current as a function of at least one of:
    a temperature of the inverter-based electric power generation device;
    a voltage of at least a portion of the inverter-based electric power generation device;
    a temperature of electric power inverter assembly; and,
    a voltage of at least a portion of the electric power inverter assembly.

7. An electric power grid support system coupled to a portion of an electric power grid, said electric power grid support system comprising:
    an electric power delivery system comprising:
        at least one inverter-based electric power generation device; and,
        an electric power inverter assembly coupled to said inverter-based electric power generation device; and, at least one processor operatively coupled to said electric power inverter assembly, said processor programmed to:
- transmit at least one signal to said electric power inverter assembly to inject at least one of real current and reactive current into the portion of the electric power grid during periods of low voltage conditions at least partially resulting from a fault-induced delayed voltage recovery (FIDVR);
- modulate the amplitudes and frequencies of the real current and the reactive current as a function of at least one electric power grid condition feedback signal; and,
- drive said electric power inverter assembly to transmit electric current in excess of a predetermined current parameter for a predetermined period of time.

8. An electric power grid support system in accordance with claim 7, wherein said processor is operatively coupled to at least one of:
- at least one voltage measurement device coupled to the electric power grid;
- at least one frequency measurement device coupled to the electric power grid;
- at least one electric current measuring device coupled to the electric power grid; and,
- at least one electric current measuring device coupled to said electric power inverter assembly.

9. An electric power grid support system in accordance with claim 7, further comprising at least one of:
- an electric power grid communications device;
- an induction motor load communications device; and,
- an electric power delivery system status device.

10. An electric power grid support system in accordance with claim 7, further comprising at least one additional electric power generation device coupled to said electric power inverter assembly in parallel with said inverter-based power generation device.

11. An electric power grid support system in accordance with claim 7, wherein said electric power delivery system comprises a photovoltaic (PV) electric power generation device comprising at least one solar panel positioned on a residential roof-top.

12. A controller for use in facilitating control of a fault-induced delayed voltage recovery (FIDVR) on an electric power grid, said controller comprising:
a memory device configured to store at least one of:
- a frequency of the electric power grid; and,
- a voltage of the electric power grid;

a processor coupled to said memory device and programmed to:
- transmit electric current from an inverter-based electric power generation device to an electric power inverter assembly;
- transmit real current and reactive current from the electric power inverter assembly to the portion of the electric power grid; and,
- command at least one of the inverter-based electric power generation device and the electric power inverter assembly to generate and transmit at least one of real and reactive current in excess of predetermined parameters of the inverter-based electric power generation device and the electric power inverter assembly for a redetermined period of time; and, a communication interface coupled to said processor and said electric power inverter assembly, said communication interface configured to transmit an operational adjustment to the electric power inverter assembly to modulate the real current and the reactive current as a function of the electric power grid frequency and the electric power grid voltage.

13. A controller in accordance with claim 12, wherein said processor is further programmed to determine that a decrease of voltage on the electric power grid is due to a FIDVR.

14. A controller in accordance with claim 12, wherein said processor is further programmed to at least one of:
- determine that at least one induction motor is one of stalled or stalling; and,
- sense electric power grid conditions that induce stalling of induction motors.

15. A controller in accordance with claim 12, wherein said processor is further programmed to apportion the real current and the reactive current as a function of at least one of:
- the frequency of the electric power grid;
- the voltage of the electric power grid; and,
- a slip of an induction motor.

16. A controller in accordance with claim 12, wherein said processor is further programmed to at least one of:
- transmit apportioned real current and reactive current to at least one of a stalled and stalling rotor of an induction motor; and,
- induce inertial forces on the rotor of the induction motor to facilitate at least one of unstalling the rotor and preventing stalling of the rotor.

* * * * *